United States Patent [19]

Kawano et al.

[11] Patent Number: 5,393,803
[45] Date of Patent: Feb. 28, 1995

[54] MALEIMIDE POLYMERS AND CONTACT LENSES FROM SUCH POLYMERS

[76] Inventors: Teiji Kawano, 16, Takehana Jizoji Minami-cho, Yamashina-ku, Kyoto, 607; Mitsuru Yokota, 1-24-20-402, Asahigaoka, Otsu-shi, shiga, 520, both of Japan

[21] Appl. No.: 30,609

[22] Filed: Mar. 12, 1993

[30] Foreign Application Priority Data

Mar. 12, 1992 [JP] Japan ............... 4-053668

[51] Int. Cl.⁶ ..................... C08J 3/00; G02C 7/04
[52] U.S. Cl. ..................... 523/107; 523/108; 526/245; 526/248; 526/262; 526/266; 351/160 H
[58] Field of Search ........... 523/107, 108; 526/248, 526/245, 262, 266, 279; 351/160 H, 160 R

[56] References Cited

U.S. PATENT DOCUMENTS

| | | | |
|---|---|---|---|
| 4,806,608 | 2/1989 | Klemarczyk | 526/262 |
| 5,098,971 | 3/1992 | Nagai | 526/248 |

*Primary Examiner*—Paul R. Michl
*Assistant Examiner*—LaVonda R. DeWitt
*Attorney, Agent, or Firm*—Fish & Richardson

[57] ABSTRACT

A maleimide polymer comprises units derived from a maleimide derivative represented by the following general formula (I):

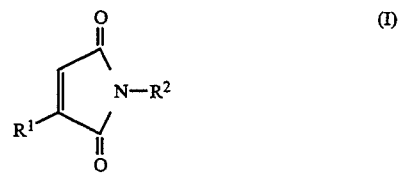

where $R^1$ is a hydrogen atom or a methyl group, and $R^2$ is an alkyl, alkenyl or aryl group, each of which groups is substituted by at least one organosiloxane group or fluorine atom, or comprises a copolymer of (1) a maleimide derivative represented by the formula (I) but in which $R^2$ may be hydrogen or any optionally substituted aliphatic hydrocarbon or aryl group with (2) an alkyl or fluoroalkyl methacrylate or an organosiloxy styrene- or organosiloxy-(meth)acrylic acid derivative.

The polymer material may be formulated into contact lenses high in oxygen permeability and having good mechanical properties.

18 Claims, No Drawings

MALEIMIDE POLYMERS AND CONTACT LENSES FROM SUCH POLYMERS

FIELD OF THE INVENTION

This invention relates to maleimide polymer compositions and to contact lenses made from them.

BACKGROUND OF THE INVENTION

In recent years, polymers containing an organosiloxane substituted methacrylate such as tris(trimethylsiloxy)silylpropyl methacrylate or a modified polysiloxane as a component have been developed and used as materials for contact lenses with high oxygen permeability (JP-A-85-142324 and JP-A-79-24047).

However, due to the hydrophobic nature of the siloxane constituent, these materials tend to exhibit repellency of lachrymal tears on the surface and to result in clouding of the lenses.

Furthermore, as a result of the low inter-molecular interaction peculiar to the silicone constituent, they show poor creep characteristics and low impact strength as physical disadvantages.

Moreover, when the copolymerization of comonomers consisting of a hydrophilic monomer with active hydrogen such as 2-hydroxyethyl methacrylate and the silicone monomers is carried out in order to modify the lens material by polymer reaction or to improve the hydrophilic property of the polymer, then the further disadvantage arises that the electrostatic repulsion between hydroxyl groups as polar groups and siloxane portions as non-polar groups causes phase separation, not allowing a transparent polymer to be obtained.

SUMMARY OF THE INVENTION

An object of the present invention is to provide polymers from which contact lenses may be prepared.

Another object of the invention is to provide contact lenses which are high in oxygen permeability and excellent in mechanical properties such as impact strength.

The present invention provides a polymer comprising units derived from a maleimide derivative represented by the following general formula (I)

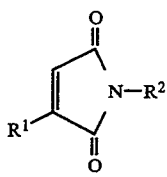

where $R^1$ is a hydrogen atom or a methyl group, and $R^2$ is an alkyl, alkenyl or aryl group, each of which groups is substituted by at least one organosiloxane group or fluorine atom. The invention also provides contact lenses obtained from a plastics material comprising such a polymer.

The invention additionally provides a contact lens obtained from a plastics material comprising a polymer, which polymer comprises units derived from a maleimide derivative represented by the formula (I)′

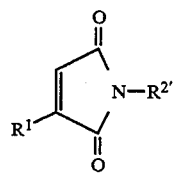

wherein $R^1$ is as defined above and $R^2$ is selected from a hydrogen atom, an optionally substituted aliphatic hydrocarbon group, especially an alkyl or alkenyl group, and an optionally substituted aryl group, which optionally substituted aliphatic hydrocarbon and aryl groups are each optionally additionally substituted by at least one organosiloxane group or fluorine atom.

The invention further provides a copolymer (and a contact lens obtained from a copolymer), which copolymer comprises units derived from
(a) a maleimide derivative of the above formula (I)′; and
(b) a copolymerizable derivative selected from
  i) at least one (meth)acrylic acid ester selected from an alkyl(meth)acrylate and a fluoroalkyl(meth)acrylate; or
  ii) at least one styrene derivative of the formula

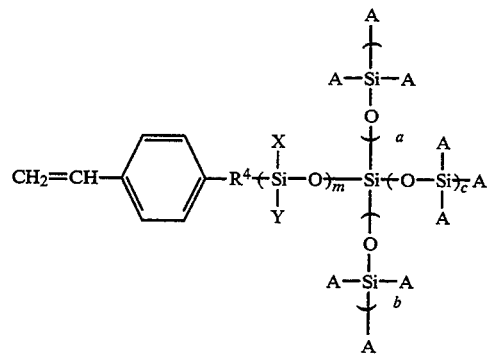

wherein $R^4$, X, Y, A, m, a, b and c are as later defined; or (c) at least one (meth)acrylic acid siloxanyalkyl ester of the structure

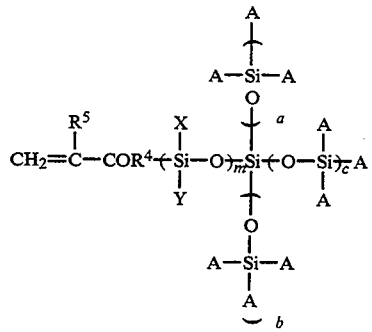

wherein $R^4$, X, Y, A, m, a, b and c are as later defined and $R^5$ is a hydrogen atom or a methyl group.

DESCRIPTION OF PREFERRED EMBODIMENTS

The maleimide derivative of the present invention is characterized by the existence of an imide group as providing both a polar group and a rigid five-membered ring. Moreover, as a result of the substituent group on the nitrogen atom as later described, the polymer may be very effectively used as a material for contact lenses.

In the maleimide derivative of the invention represented by the general formula (I)′, $R^{2'}$ is a hydrogen atom or an optionally substituted aliphatic hydrocarbon, preferably an alkyl, alkenyl, or aryl, group. The alkyl or alkenyl group may be either a straight chain or branched chain group, and is preferably an alkyl or alkenyl group with 2 to 30 carbon atoms selected, for example, from an ethyl group, propyl group, isopropyl group, n-butyl group, sec-butyl group, t-butyl group, n-pentyl group, neopentyl group, n-octyl group, n-decyl group, n-dodecyl group, n-tetradecyl group, cyclohexyl group, hydroxyethyl group, hydroxybutyl group, ethoxyethyl group, butoxyethyl group, allyl group and an acetoxyethyl group. The aryl group is preferably an aryl group with 6 to 20 carbon atoms selected, for example, from a phenyl group, 4-hydroxyphenyl group, 4-carboxyphenyl group, 2-methoxyphenyl group, 4-methoxyphenyl group, 2-methylphenyl group, 4-methylphenyl group and a naphthyl group. Above all, if $R^2$ is an aryl group, a polymer high in both refractive index and glass transition temperature can be obtained, and if $R^2$ is a long-chain alkyl group with 10 or more carbon atoms, a polymer low in glass transition temperature and high in oxygen permeability can be obtained. Furthermore, $R^2$ contains, as a substituent, at least one organosiloxane group or fluorine atom, which substituent may depend from the aliphatic hydrocarbon, especially the alkyl or alkenyl, moiety or aryl moiety itself or, when another substituent is present thereon, from that other substituent. If the group $R^2$ is at least partially substituted by a fluorine atom, stain resistance can be achieved, and if substituted by organosiloxane, high oxygen permeability can be achieved.

When a group $R^2$ contains an organosiloxane substituent, $R^2$ may have the formula:

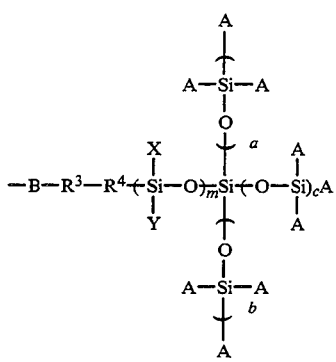

wherein:
(1) B is a direct bond, a phenyl group or a phenyl group substituted by an organosiloxane group and/or a fluorine atom;
(2) $R^3$ is a direct bond, an ester linkage or an amide linkage;
(3) $R^4$ is a $C_{1-5}$ alkyl group;
(4) X, Y and A are each, independently of one another, a $C_{1-5}$ alkyl group, a phenyl group or a fluoroalkyl group;
(5) m is from 0 to 200 inclusive, and
(6) a, b and c are each independently of one another from 0 to 2 inclusive.

When a group $R^2$ contains a fluorine atom as substituent, $R^2$ may have the formula:

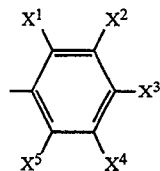

wherein $X^1$, $X^2$, $X^3$, $X^4$ and $X^5$ are each, independently of one another, a hydrogen atom, a fluorine atom or a fluoroalkyl group.

Groups substituted by a fluorine atom and/or organosiloxane include, for example, —CH$_2$(CF$_2$)$_2$H, —CH$_2$CF$_2$CF$_3$, —CH$_2$(CF$_2$)$_4$H, —CH$_2$(CF$_2$)$_3$CF$_3$, —CH$_2$CF$_3$, —CH(CF$_3$)$_2$.

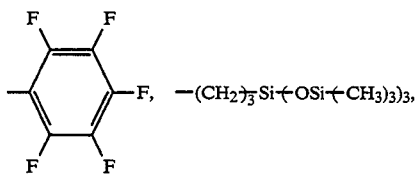

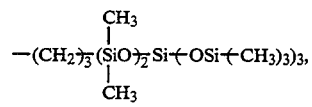

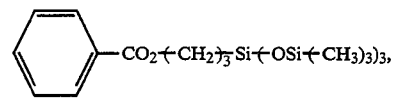

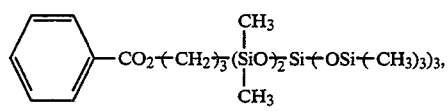

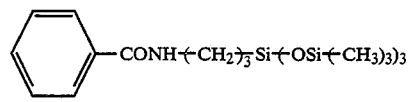

and

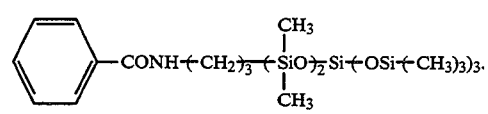

Examples of the maleimide derivative represented by the general formula (I) are given below:

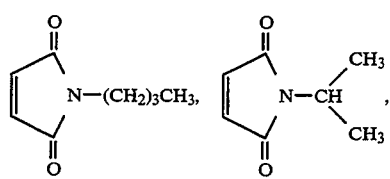

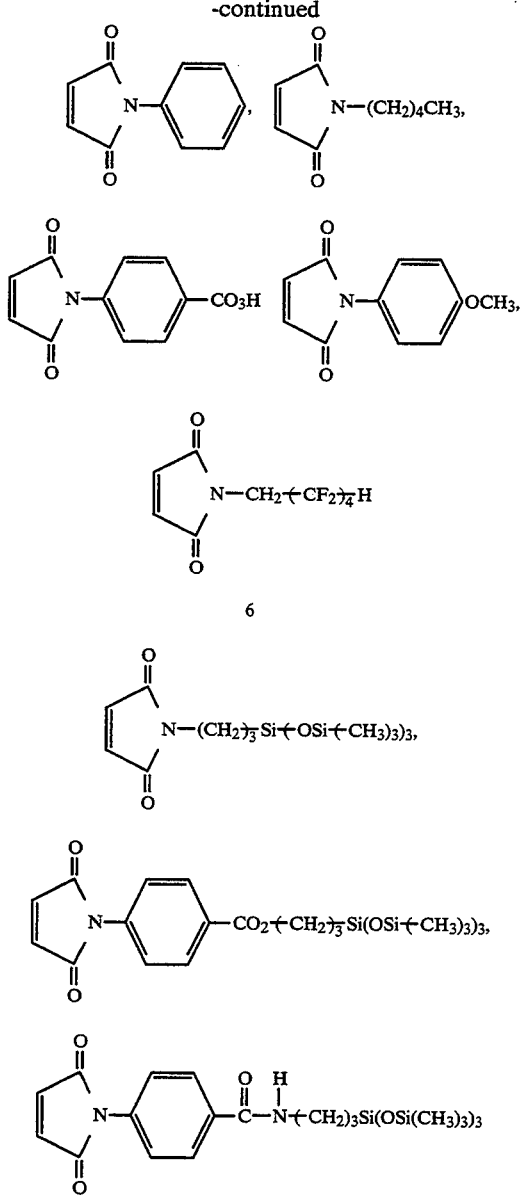

6 late, (meth)acrylic acid and heterocyclic vinyl monomers such as vinyl carbazole and N-vinylpyrrolidone.

The amount of the maleimide derivative contained in the polymer is not especially limited but is preferably at least 5 wt %, and can also be 100 wt %. If the content is less than 5 wt %, the excellent balance between oxygen permeability and mechanical properties tends to be lost.

Particularly preferred copolymers consist essentially of units derived from about 5 to 95 parts inclusive by weight of total monomer content of at least one maleimide derivative of the above formula (I)', more preferably of the above formula (I), and about 95 to 5 parts inclusive by weight of the total monomer content of:

i) at least one (meth)acrylic acid ester selected from an alkyl(meth)acrylate and a fluoroalkyl(meth)acrylate; or ii) at least one styrene derivative of the formula

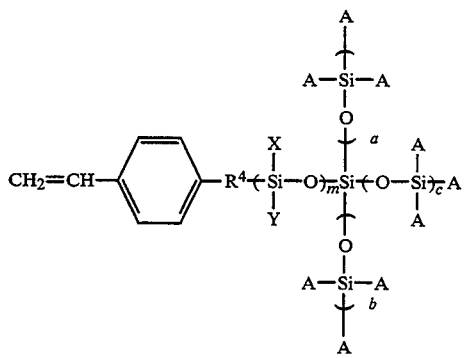

wherein $R^4$, X, Y, A, m, a, b and c are as defined above.

Another preferred copolymer consists essentially of units derived from:

(a) at least one maleimide derivative of the above formula (I)', more preferably of the above formula (I); and (b) at least one (meth)acrylic acid siloxanylalkyl ester of the structure

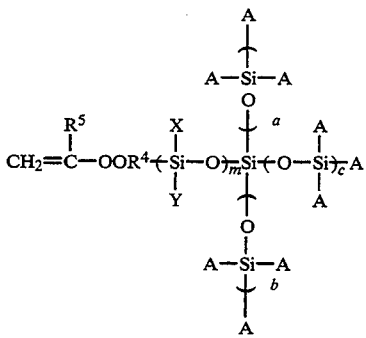

wherein $R^4$, X, Y, A, m, a, b and c are as defined above and $R^5$ is a hydrogen atom or a methyl group.

The contact lenses of the present invention can be prepared according to any of the following methods. In one method, a maleimide monomer and, as required, another comonomer are copolymerized and the polymer is machined to form lenses. In another method, a maleimide monomer and a monomer with a functional group capable of being modified later are copolymerized, and the polymer is formed into lenses which can The contact lenses of the present invention are made of a polymer comprising a maleimide derivative represented by the general formula (I) as a polymer component. When the maleimide derivative is copolymerized, either a polar monomer or a non-polar monomer can be used as the comonomer, for obtaining a transparent polymer. For example, monomers known for use in preparing conventional contact lens materials can be used without any special limitation. The non-polar monomer can be selected, for example, from alkyl (meth)acrylates (i.e. alkyl acrylates or methacrylates) such as methyl (meth)acrylate, ethyl (meth)acrylate and butyl (meth)acrylate, halogenated alkyl (meth)acrylates such as trifluoroethyl (meth)acrylate and tetrafluoroethyl (meth)acrylate, cycloalkyl (meth)acrylates such as cyclohexyl (meth)acrylate and aromatic vinyl monomers such as vinylbenzene, vinylnaphthalene and vinylethylbenzene. The polar monomer can be selected, for example, from hydroxyalkyl (meth)acrylates such as hydroxyethyl (meth)acrylate and hydroxybutyl (meth)acrybe subsequently modified by a polymer reaction. For soft lenses, mold polymerization or spin cast polymerization, for example, can also be used.

In a material for a contact lens of the present invention, it is also preferable to include an ultraviolet radiation absorbent or pigment or a coloring agent for protecting the eyes from harmful ultraviolet rays or to improve handling convenience.

The present invention enables the provision of contact lenses high in oxygen permeability and good in mechanical properties.

Embodiments of the invention will now be described with reference to the following Examples and comparative Example.

EXAMPLE 1

Fifty parts by weight of N-laurylmaleimide, 100 parts by weight of 2-hydroxyethyl methacrylate and 0.015 part by weight of ethylene glycol dimethacrylate as a cross-linkable monomer were mixed, and 0.0075 part by weight of azobisisobutyronitrile and 0.0075 part by weight of azobiscyclohexane carbonitrile as polymerization initiators were added. The mixture was placed in a test tube of 18 mm in diameter and 180 mm in height. The monomer mixture was degassed in an argon atmosphere, sealed, polymerized at first at 60° C. for 22 hours, heated from 60° C. to 110° C., taking 24 hours, and held at 110° C. for 4 hours, to obtain a polymer. The polymer obtained was homogeneous and transparent. The Shore D hardness measured was about 80. From the polymer, 0.5 mm thick disc samples were cut out, and the coefficient of oxygen permeability (DX) was measured and found to be about $15 \times 10^{11}$ cc (STP).cm/(vm$^3$.sec.mmHg), to show that the polymer has good oxygen permeability.

EXAMPLE 2

Maleic anhydride and tris(trimethylsiloxy)propylamine were caused to react at a molar ratio of 1:1, to obtain maleinamic acid. This was heated in the presence of acetic anhydride and sodium acetate, to obtain N-3-tris(trimethylsiloxy)silylpropylmaleimide. A polymer was obtained by the method of Example 1 using the resultant N-3-tris(trimethylsiloxy)silylpropylmaleimide instead of the N-laurylmaleimide used in Example 1.

Again, the polymer obtained was homogeneous and transparent, and the Shore D hardness was about 85. As in Example 1, disc samples were cut out, and the coefficient of oxygen permeability (DX) was measured and found to be about $110 \times 10^{-11}$ cc (STP).cm/(cm$_3$.sec.mmHg), to show that the polymer has good oxygen permeability.

COMPARATIVE EXAMPLE 1

A polymer was obtained as in Example 1, except that methacryloxypropyl tris(trimethylsiloxy)silane was used instead of N-laurylmaleimide. It was white and opaque.

As can be seen from the above results, these embodiments of the present invention provide contact lenses high in oxygen permeability and good in mechanical properties.

We claim:

1. A polymer comprising units derived from a maleimide derivative represented by the formula (I):

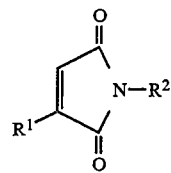

wherein $R^1$ is selected from the group consisting of a methyl group and a hydrogen atom, and $R^2$ is selected from the group consisting of an alkyl group, an alkenyl group and an aryl group, and $R^2$ is substituted by at least one substituent selected from the group consisting of an organosiloxane group and a fluorine atom, wherein the units have a maleimide group only at one end.

2. A polymer according to claim 1, wherein $R^2$ has the formula:

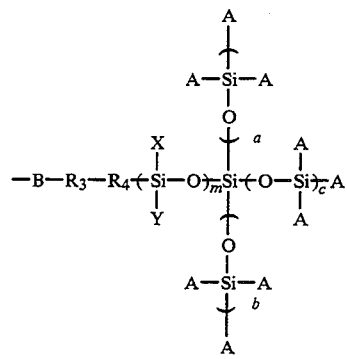

wherein:
(1) B is selected from the group consisting of a direct bond, a phenyl group and a phenyl group substituted by at least one substituent selected from an organosiloxane group and a fluorine atom;
(2) $R^3$ is selected from the group consisting of a direct bond, an ester linkage and an amide linkage;
(3) $R^4$ is a $C_{1-5}$ alkyl group;
(4) X, Y and A are each selected from the group consisting of a $C_{1-5}$ alkyl group, a phenyl group and a fluoroalkyl group;
(5) m is from 0 to 200 inclusive; and
(6) a, b and c are each independently of one another from 0 to 2 inclusive.

3. A polymer according to claim 1, wherein $R^2$ has the formula:

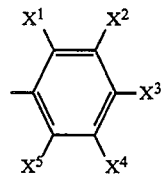

wherein $X^1$, $X^2$, $X^3$, $X^4$ and $X^5$ are each, independently of one another, selected from the group consisting of a hydrogen atom, a fluorine atom and a fluoralkyl group.

4. A copolymer consisting essentially of units derived from comonomers having as a total monomer content:
(a) about 5 to 95 parts by weight of the total monomer content of a maleimide derivative of the formula (I)′:

$$\underset{R^1}{\overset{O}{\underset{\|}{\bigwedge}}}\underset{\|}{\overset{}{N-R^{2'}}} \quad (I)'$$

wherein $R^1$ is selected from the group consisting of a methyl group and a hydrogen atom, and $R^{2'}$ is selected from the group consisting of a hydrogen atom, an optionally substituted aliphatic hydrocarbon group and an optionally substituted aryl group; wherein the maleimide derivative has a maleimide group only at one end and (b) about 95 to 5 parts by weight of the total monomer content of at least one (meth)acrylic acid ester selected from the group consisting of an alkyl(meth)acrylate and a fluoroalkyl(meth)acrylate.

5. A copolymer according to claim 4, wherein in the maleimide derivative of the formula (I)', $R^{2'}$ is selected from the group consisting of a hydrogen atom, an optionally substituted alkyl group, an optionally substituted alkenyl group and an optionally substituted aryl group, which optionally substituted alkyl, alkenyl and aryl groups are each additionally optionally substituted by at least one substituent selected from an organosiloxane group and a fluorine atom.

6. A copolymer consisting essentially of units derived from comonomers having as a total monomer content:

(a) about 5 to 95 parts by weight of the total monomer content of a maleimide derivative of the formula (I)', $$\underset{R^1}{\overset{O}{\underset{\|}{\bigwedge}}}\underset{\|}{\overset{}{N-R^{2'}}} \quad (I)'$$

wherein $R^1$ is selected from the group consisting of a methyl group and a hydrogen atom, and $R^{2'}$ is selected from the group consisting of a hydrogen atom, an optionally substituted aliphatic hydrocarbon group and an optionally substituted aryl group; and (b) about 95 to 5 parts by weight of the total monomer content of at least one styrene derivative of the formula $$CH_2=CH-\!\!\!\!\bigcirc\!\!\!\!-R^4\!\!-\!\!(\underset{Y}{\overset{X}{\underset{|}{Si}}}\!\!-\!\!O)_m\!\!\underset{|}{\overset{|}{Si}}\!\!(\!\!-\!\!O\!\!-\!\!\underset{|}{\overset{|}{Si}}\!\!)_c\!\!A$$

with side groups $A-Si-A$ (a) above and $A-Si-A$ (b) below each bearing A substituents wherein:

(1) B is selected from the group consisting of a direct bond, a phenyl group and a phenyl group substituted by at least one substituent selected from an organosiloxane group and a fluorine atom;

(2) $R^3$ is selected from the group consisting of a direct bond, an ester linkage and an amide linkage;

(3) $R^4$ is a $C_{1-5}$ alkyl group;

(4) X, Y and A are each selected from the group consisting of a $C_{1-5}$ alkyl group, a phenyl group and a fluoroalkyl group;

(5) m is from 0 to 200 inclusive; and (6) a, b and c are each independently of one another from 0 to 2 inclusive.

7. A copolymer consisting essentially of units derived from comonomers having as a total monomer content:

(a) at least one maleimide derivative of the formula (I)'

$$\underset{R^1}{\overset{O}{\underset{\|}{\bigwedge}}}\underset{\|}{\overset{}{N-R^{2'}}} \quad (I)'$$

wherein $R^1$ is selected from the group consisting of a methyl group and hydrogen atom, and $R^{2'}$ is selected from the group consisting of a hydrogen atom, an optionally substituted aliphatic hydrocarbon group and an optionally substituted aryl group; and (b) at least one (meth)acrylic acid siloxanylalkyl ester of the structure $$CH_2=\underset{R^5}{\overset{|}{C}}-OOR^4\!\!-\!\!(\underset{Y}{\overset{X}{\underset{|}{Si}}}\!\!-\!\!O)_m\!\!\underset{|}{\overset{|}{Si}}\!\!(\!\!-\!\!O\!\!-\!\!\underset{|}{\overset{|}{Si}}\!\!)_c\!\!A$$

wherein:

(1) B is selected from the group consisting of a direct bond, a phenyl group and a phenyl group substituted by at least one substituent selected from an organosiloxane group and a fluorine atom;

(2) $R^3$ is selected from the group consisting of a direct bond, an ester linkage and an amide linkage;

(3) $R^4$ is a $C_{1-5}$ alkyl group;

(4) X, Y and A are each selected from the group consisting of a $C_{1-5}$ alkyl group, a phenyl group and a fluoroalkyl group;

(5) m is from 0 to 200 inclusive; and (6) a, b and c are each independently of one another from 0 to 2 inclusive; and $R^5$ is selected from a hydrogen atom and a methyl group.

8. A copolymer according to claim 7, wherein in the maleimide derivative of the formula (I)', $R^{2'}$ is selected from the group consisting of a hydrogen atom, an optionally substituted alkyl group, an optionally substituted alkenyl group and an optionally substituted aryl group, which optionally substituted alky, alkenyl and aryl groups are each additionally optionally substituted by at least one substituent selected from an organosiloxane group and a fluorine atom.

9. A contact lens comprising a polymer, which polymer comprises units derived from a maleimide derivative represented by the formula (I)':

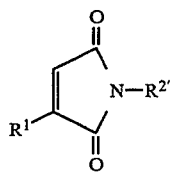
(I)' wherein $R^1$ is selected from the group consisting of a methyl group and a hydrogen atom, and $R^2$ is selected from the group consisting of a hydrogen atom, an optionally substituted aliphatic hydrocarbon group and an optionally substituted aryl group.

10. A contact lens according to claim 9, wherein, in the formula (I)', $R^{2'}$ is selected from the group consisting of an optionally substituted alkyl group, an optionally substituted alkenyl group and an optionally substituted aryl group, each of which groups is additionally optionally substituted by at least one substituent selected from an organosiloxane and a fluorine atom.

11. A contact lens according to claim 10, wherein, in the polymer, $R^{2'}$ has the formula:

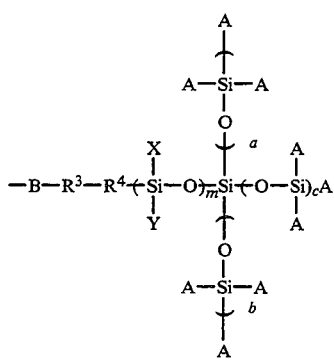

wherein:
(1) B is selected from the group consisting of a direct bond, a phenyl group and a phenyl group substituted by at least one substituent selected from an organosiloxane group and a fluorine atom;
(2) $R^3$ is selected from the group consisting of a direct bond, an ester linkage and an amide linkage;
(3) $R^4$ is a $C_{1-5}$ alkyl group;
(4) X, Y and A are each selected from the group consisting of a $C_{1-5}$ alkyl group, a phenyl group and a fluoroalkyl group;
(5) m is from 0 to 200 inclusive; and
(6) a, b and c are each independently of one another from 0 to 2 inclusive.

12. A contact lens according to claim 10, wherein, in the polymer, $R^{2'}$ has the formula:

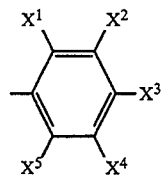

wherein $X^1$, $X^2$, $X^3$, $X^4$ and $X^5$ are each, independently of one another, selected from the group consisting of a hydrogen atom, a fluorine atom and a fluoroalkyl group.

13. A contact lens comprising a copolymer consisting essentially of units derived from comonomers having as a total monomer content:
(a) about 5 to 95 parts by weight of the total monomer content of a maleimide derivative of the formula (I)':

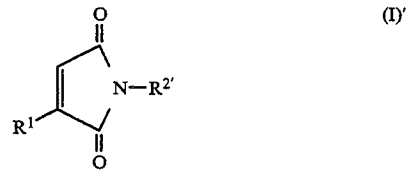

wherein $R^1$ is selected from the group consisting of a methyl group and a hydrogen atom, and $R^{2'}$ is selected from the group consisting of a hydrogen atom, an optionally substituted aliphatic hydrocarbon group and an optionally substituted aryl group; and (b) about 95 to 5 parts by weight of the total monomer content of at least one (meth)acrylic acid ester selected from the group consisting of an alkyl(meth)acrylate and a fluoroalkyl(meth)acrylate.

14. A contact lens according to claim 13, wherein in the maleimide derivative of the formula (I)', $R^{2'}$ is selected from the group consisting of a hydrogen atom, an optionally substituted alkyl group, an optionally substituted alkenyl group and an optionally substituted aryl group, which optionally substituted alkyl, alkenyl and aryl groups are each additionally optionally substituted by at least one substituent selected from an organosiloxane group and a fluorine atom.

15. A contact lens comprising a copolymer consisting essentially of units derived from comonomers having as a total monomer content:
(a) about 5 to 95 parts by weight of the total monomer content of a maleimide derivative of the formula (I)'

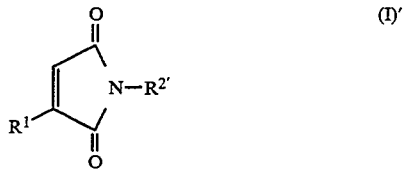

wherein $R^1$ is selected from the group consisting of a methyl group and a hydrogen atom, and $R^{2'}$ is selected from the group consisting of a hydrogen atom, an optionally substituted aliphatic hydrocarbon group and an aryl group; and (b) about 95 to 5 parts by weight of the total monomer content of at least one styrene derivative of the formula

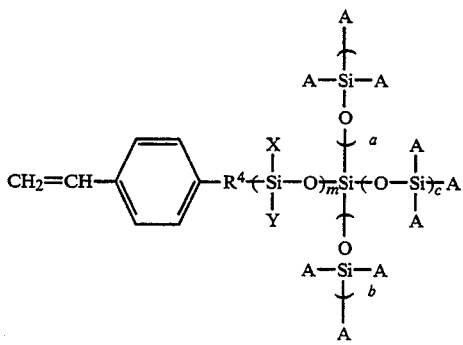

wherein:
(1) B is selected from the group consisting of a direct bond, a phenyl group and a phenyl group substituted by at least one substituent selected from an organosiloxane group and a fluorine atom;
(2) $R^3$ is selected from the group consisting of a direct bond, an ester linkage and an amide linkage;
(3) $R^4$ is a $C_{1-5}$ alkyl group;
(4) X, Y and A are each selected from the group consisting of a $C_{1-5}$ alkyl group, a phenyl group and a fluoroalkyl group;
(5) m is from 0 to 200 inclusive; and
(6) a, b and c are each independently of one another from 0 to 2 inclusive.

16. A contact lens according to claim 15, wherein in the maleimide derivative of the formula (I)', $R^{2'}$ is selected from the group consisting of a hydrogen atom, an optionally substituted alkyl group, an optionally substituted alkenyl group and an optionally substituted aryl group, which optionally substituted alkyl, alkenyl and aryl groups are each additionally optionally substituted by at least one substituent selected from an organosiloxane group and a fluorine atom.

17. A contact lens comprising a copolymer consisting essentially of units derived from:
(a) at least one maleimide derivative of the formula (I)'

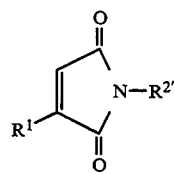

wherein $R^1$ is selected from the group consisting of a methyl group and hydrogen atom, and $R^{2'}$ is selected from the group consisting of a hydrogen atom, an optionally substituted aliphatic hydrocarbon group and an optionally substituted aryl group; and (b) at least one (meth)acrylic acid siloxanylalkyl ester of the structure

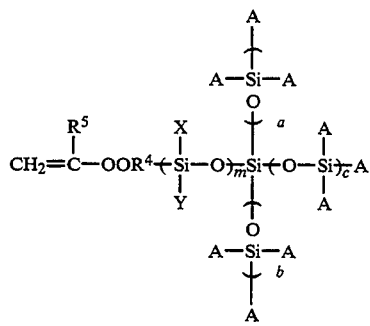

wherein:
(1) B is selected from the group consisting of a direct bond, a phenyl group and a phenyl group substituted by at least one substituent selected from an organosiloxane group and a fluorine atom;
(2) $R^3$ is selected from the group consisting of a direct bond, an ester linkage and an amide linkage;
(3) $R^4$ is a $C_{1-5}$ alkyl group;
(4) X, Y and A are each selected from the group consisting of a $C_{1-5}$ alkyl group, a phenyl group and a fluoroalkyl group;
(5) m is from 0 to 200 inclusive; and
(6) a, b and c are each independently of one another from 0 to 2 inclusive; and $R^5$ is selected from a hydrogen atom and a methyl group.

18. A contact lens according to claim 17, wherein in the maleimide derivative of the formula (I)', $R^{2'}$ is selected from the group consisting of a hydrogen atom, an optionally substituted alkyl group, an optionally substituted alkenyl group and an optionally substituted aryl group, which optionally substituted alkyl, alkenyl and aryl groups are each additionally optionally substituted by at least one substituent selected from an organosiloxane group and a fluorine atom.

* * * * *